United States Patent
Yoshida

[19]
[11] Patent Number: 5,928,365
[45] Date of Patent: *Jul. 27, 1999

[54] COMPUTER SYSTEM USING SOFTWARE CONTROLLED POWER MANAGEMENT METHOD WITH RESPECT TO THE MAIN MEMORY ACCORDING TO A PROGRAM'S MAIN MEMORY UTILIZATION STATES

[75] Inventor: Hideki Yoshida, Kanagawa, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/758,099

[22] Filed: Nov. 29, 1996

[30]     Foreign Application Priority Data

Nov. 30, 1995 [JP] Japan .................................. 7-313015

[51] Int. Cl.$^6$ ........................................................ G06F 1/00
[52] U.S. Cl. .......................... 713/324; 713/340; 711/104; 365/222
[58] Field of Search ........................ 395/750.03, 750.07, 395/750.06, 750.08; 711/147, 166, 106, 118, 170, 167, 173; 364/707; 365/226, 229, 222

[56]                References Cited

U.S. PATENT DOCUMENTS

| | | | |
|---|---|---|---|
| 5,404,543 | 4/1995 | Faucher et al. .......................... | 395/750 |
| 5,414,861 | 5/1995 | Horning ................................... | 395/750 |
| 5,465,367 | 11/1995 | Reddy et al. ............................ | 365/222 |
| 5,524,248 | 6/1996 | Parks et al. .............................. | 711/104 |
| 5,530,877 | 6/1996 | Hanaoka .................................. | 395/750 |
| 5,537,531 | 7/1996 | Suga et al. ............................... | 395/164 |
| 5,551,008 | 8/1996 | Saito ........................................ | 711/161 |
| 5,615,162 | 3/1997 | Houston .................................. | 365/226 |
| 5,675,814 | 10/1997 | Pearce ..................................... | 395/750 |
| 5,696,897 | 12/1997 | Dong .................................. | 395/182.13 |
| 5,706,407 | 1/1998 | Nakamura et al. ....................... | 395/86 |
| 5,778,443 | 7/1998 | Swanberg et al. ...................... | 711/162 |
| 5,825,704 | 10/1998 | Shau ....................................... | 365/222 |

*Primary Examiner*—Ayaz R. Sheikh
*Assistant Examiner*—Raymond N Phan
*Attorney, Agent, or Firm*—Oblon, Spivak, McClelland, Maier & Neustadt, P.C.

[57]                ABSTRACT

A computer system and its power management method capable of realizing a software control of the power supply with respect to the main memory according to a program's main memory utilization state, which are suitable for the power saving in a portable information terminal. In a computer system having a main memory device formed by a plurality of memory banks, a power source for supplying a power to operate the main memory device, and a processor for executing programs and managing allocation and release of memory regions on the main memory device with respect to the programs, a memory power management function determines any unused memory bank in which all memory regions are currently unused according to a state of the allocation and release of the memory regions on the main memory devices with respect to the programs managed by the processor, and selectively stops a power supply from the power source to the unused memory bank while supplying the power from the power source to remaining memory banks other than the unused memory bank.

20 Claims, 16 Drawing Sheets

| MEMORY BANK | ADDRESS RANGE |
|---|---|
| MEMORY BANK - 1 | 000000 ~ 0FFFFF(H) |
| MEMORY BANK - 2 | 100000 ~ 1FFFFF(H) |
| MEMORY BANK - 3 | 200000 ~ 2FFFFF(H) |
| MEMORY BANK - 4 | 300000 ~ 3FFFFF(H) |
| MEMORY BANK - 5 | 400000 ~ 4FFFFF(H) |

COMPUTER SYSTEM USING SOFTWARE CONTROLLED POWER MANAGEMENT METHOD WITH RESPECT TO THE MAIN MEMORY ACCORDING TO A PROGRAM'S MAIN MEMORY UTILIZATION STATES

BACKGROUND OF THE INVENTION

1. Field of the Invention

The present invention relates to a computer system and a power management method for a computer system, and in particular, a computer system which requires a battery operation such as a portable information terminal and its power management method for the purpose of power saving.

2. Description of the Background Art

In general, in a computer system, a memory device called main memory is utilized as means for storing a currently executed program and data to be directly read or written by that program. This memory device is usually formed by utilizing volatile semiconductor memory elements in which the stored content is lost when the power is turned off.

In a conventional computer system, all the semiconductor memory elements which constitute the main memory are connected to the same power supply so that, once the power of the computer system is turned on, the power is continually supplied to all the semiconductor memory elements until the power of the computer system is turned off.

The power management method for such a main memory device is not so important as long as the power consumed by the main memory device is sufficiently small compared with the power consumed by the entire computer system. However, in a portable information terminal using a battery operation such as PDA (Personal Digital Assistance) or notebook type PC that has become popular in recent years, the structural elements of the computer system are made to be progressively less power consuming as a result of measures such as a use of a flash memory instead of a magnetic disk as a secondary memory device, and a use of a liquid crystal display instead of a CRT as a display device, so that the power consumption by the main memory device is becoming unignorable.

In order to reduce the power consumption by the main memory device, it is possible to adopt a scheme to reduce the power required for maintaining the stored content by using memory elements such as SRAMs instead of usually used DRAMs, but the memory elements such as SRAMs are very expensive compared with DRAMs and have only limited capacities so that it is often quite inappropriate to use such memory elements as a replacement for DRAMs. Consequently, there is a demand for a scheme to reduce the power consumption of the main memory device without abandoning the use of the usually used memory elements such as DRAMs.

As a possible solution to this demand, there has been a proposition as disclosed in Japanese Patent Application Laid Open No. 2-222048 (1990). In this proposition, a DRAM element to which data are to be actually written among a plurality of DRAM elements constituting a memory card is detected by means of hardware, and the power is supplied only to the detected DRAM element while the power supply to the other DRAM elements is interrupted.

However, in this proposition of Japanese Patent Application Laid Open No. 2-222048 (1990), once the data write is made for a particular DRAM element, the power will be continually supplied to this particular DRAM element subsequently, even after its data content is no longer utilized as valid one.

In general, when an execution of a program in the computer system is considered, there can be a case in which the valid data that have been stored up until now will be invalidated as a result of a termination of the program execution, for example. In such a case, it is difficult to judge whether each data on the main memory is a valid one or an invalid one by means of hardware.

Consequently, in order to control the power supply to the main memory device efficiently, there is a need for a control by a software which is responsible for the memory management as well.

In addition, for a case in which a user depresses a wait switch (a suspend button) on the computer system, or a case in which a user does not operate the computer system for a prescribed period of time, it is also preferable to reduce the power consumption further by limiting a number of power supply target memory elements.

SUMMARY OF THE INVENTION

It is therefore an object of the present invention to provide a computer system and its power management method capable of realizing a software control of the power supply with respect to the main memory according to a program's main memory utilization state, which are suitable for the power saving in a portable information terminal.

According to one aspect of the present invention there is provided a computer system, comprising: a main memory device formed by a plurality of memory banks; a power source for supplying a power to operate the main memory device; a processor for executing programs and managing allocation and release of memory regions on the main memory device with respect to the programs; and memory power management means for determining any unused memory bank in which all memory regions are currently unused according to a state of the allocation and release of the memory regions on the main memory devices with respect to the programs managed by the processor, and selectively stopping a power supply from the power source to the unused memory bank while supplying the power from the power source to remaining memory banks other than the unused memory bank.

According to another aspect of the present invention there is provided a computer system, comprising: a main memory device formed by a plurality of memory banks in forms of memory elements which require refresh operations in order to maintain stored data; a processor for executing programs and managing allocation and release of memory regions on the main memory device with respect to the programs; and memory power management means for determining any unused memory bank in which all memory regions are currently unused according to a state of the allocation and release of the memory regions on the main memory devices with respect to the programs managed by the processor, and selectively stopping a refresh signal for the unused memory bank while providing refresh signals for remaining memory banks other than the unused memory bank.

According to another aspect of the present invention there is provided a memory power management method for a computer system having a main memory device formed by a plurality of memory banks, a power source for supplying a power to operate the main memory device, and a processor for executing programs and managing allocation and release of memory regions on the main memory device with respect to the programs, the method comprising the steps of: determining any unused memory bank in which all memory regions are currently unused according to a state of the allocation and release of the memory regions on the main memory devices with respect to the programs managed by the processor; and selectively stopping a power supply from the power source to the unused memory bank while supplying the power from the power source to remaining memory banks other than the unused memory bank.

According to another aspect of the present invention there is provided a memory power management method for a computer system having a main memory device formed by a plurality of memory banks in forms of memory elements which require refresh operations in order to maintain stored data, and a processor for executing programs and managing allocation and release of memory regions on the main memory device with respect to the programs, the method comprising the steps of: determining any unused memory bank in which all memory regions are currently unused according to a state of the allocation and release of the memory regions on the main memory devices with respect to the programs managed by the processor; and selectively stopping a refresh signal for the unused memory bank while providing refresh signals for remaining memory banks other than the unused memory bank.

According to another aspect of the present invention there is provided an article of manufacture, comprising: a computer usable medium having computer readable program code means embodied therein for causing a computer to function as a memory power management unit for a computer system having a main memory device formed by a plurality of memory banks, a power source for supplying a power to operate the main memory device, and a processor for executing programs and managing allocation and release of memory regions on the main memory device with respect to the programs, the computer readable program code means including: first computer readable program code means for causing said computer to determine any unused memory bank in which all memory regions are currently unused according to a state of the allocation and release of the memory regions on the main memory devices with respect to the programs managed by the processor; and second computer readable program code means for causing said computer to selectively stop a power supply from the power source to the unused memory bank while supplying the power from the power source to remaining memory banks other than the unused memory bank.

According to another aspect of the present invention there is provided an article of manufacture, comprising: a computer usable medium having computer readable program code means embodied therein for causing a computer to function as a memory power management unit for a computer system having a main memory device formed by a plurality of memory banks in forms of memory elements which require refresh operations in order to maintain stored data, and a processor for executing programs and managing allocation and release of memory regions on the main memory device with respect to the programs, the computer readable program code means including: first computer readable program code means for causing said computer to determine any unused memory bank in which all memory regions are currently unused according to a state of the allocation and release of the memory regions on the main memory devices with respect to the programs managed by the processor; and second computer readable program code means for causing said computer to selectively stop a refresh signal for the unused memory bank while providing refresh signals for remaining memory banks other than the unused memory bank.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 8, the first embodiment of a computer system and its power management method according to the present invention will be described in detail.

Figure 1:
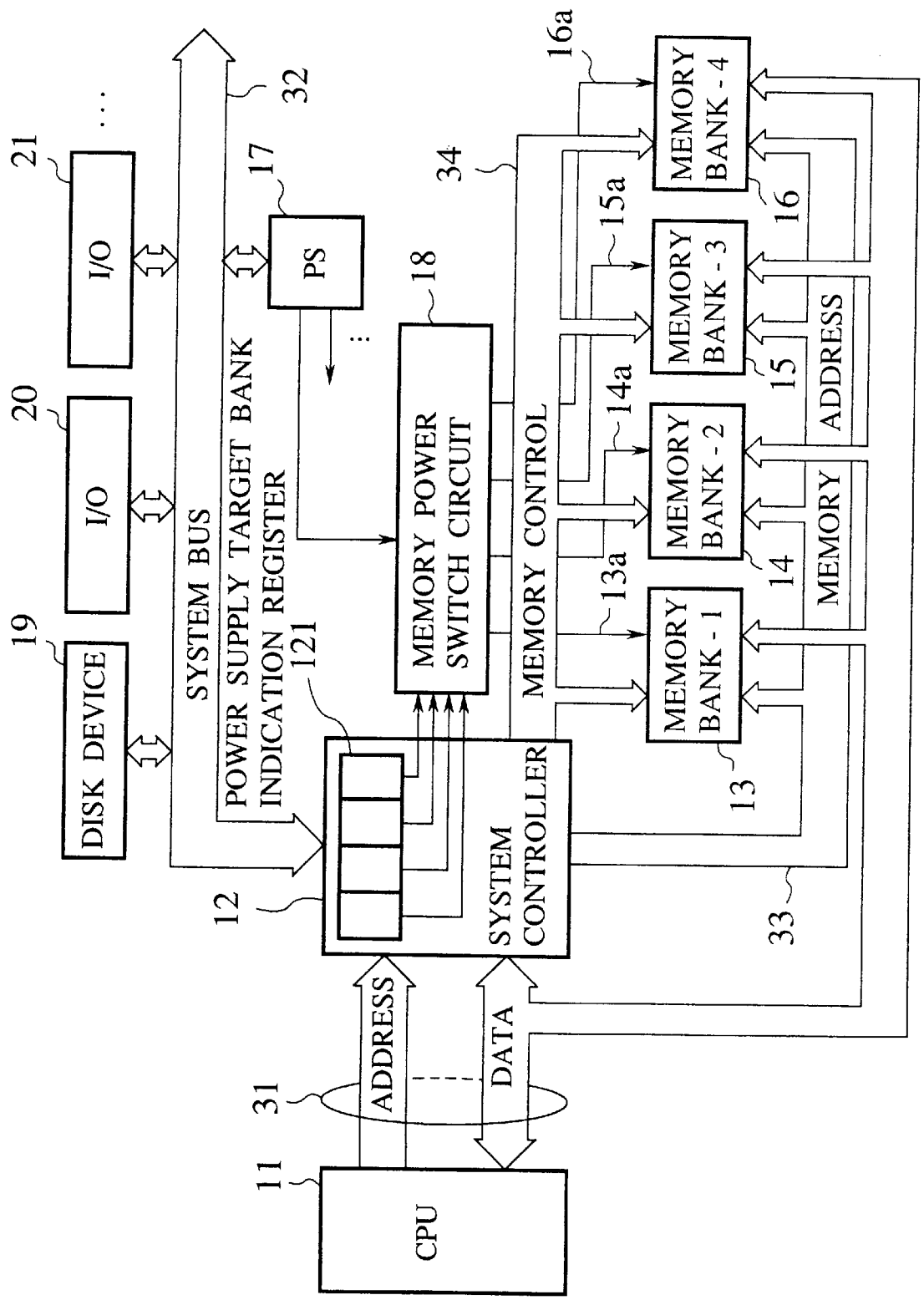
FIG. 1 is a block diagram showing a hardware configuration of a main part of the computer system in the first embodiment of the present invention.

FIG. 1 shows a hardware configuration of a portion related to the main memory device in the computer system of this first embodiment. This computer system of FIG. 1 is for realizing a portable information terminal that can be battery operated such as PDA or notebook type PC, and includes a CPU 11, a system controller 12, a plurality (four in this example) of memory banks (memory bank-1 to memory bank-4) 13–16, a power source circuit (PS) 17, a memory power switch circuit 18, a disk device 19, and various I/O devices 20 and 21.

The CPU 11 is a microprocessor for executing the operating system and the application programs, and carrying out an overall control of this computer system, which is connected with the system controller 12 through a CPU local bus 31. The CPU local bus 31 is a group of signal lines which are directly connected to input/output pins of the microprocessor constituting the CPU 11, and includes a data bus, an address bus, and various status signal lines.

The system controller 12 is connected between the CPU local bus 31 and a system bus 32, and controls all the memory devices and the I/O devices according to requests from the CPU 11. This system controller 12 is realized by a single LSI formed by a gate array, in which a memory control logic for controlling DRAMs constituting the memory banks 13–16 is implemented. In addition, the system controller 12 is provided with a power supply target bank indication register 121 which can be read or written by the CPU 11. This power supply target bank indication register 121 registers a power control information for indicating whether or not to supply the power to each of the four memory banks 13–16, which is written by the CPU 11.

The four memory banks 13–16 constitute the main memory of this computer system, and the main memory constituted by these memory banks 13–16 stores the operating system, the application programs to be executed, and various processing data to be read or written directly by these programs.

The four memory banks 13–16 are 32 bit memory devices that can be accessed independently, for example, and each memory device is formed by a DRAM of one or more chips. In each of the memory banks 13–16, a data input/output terminal is connected with the 32 bit data bus of the CPU local bus 31, and an address input terminal is connected with a memory address bus 33, while a control signal terminal is connected with a memory control signal line 34.

The memory address bus 33 is an address bus dedicated to the DRAMs, to which a physical address (row address/column address) of the DRAM is outputted from the system controller 12. The memory control signal line 34 conveys RAS (Row Address Strobe signal), CAS (Column Address Strobe signal), output enable signal, write enable signal, etc. for the DRAM access control. In addition, the memory banks 13–16 are connected with mutually different power lines 13a to 16a, respectively.

The memory power switch circuit 18 receives the memory power from the power source circuit 17 and supplies the received memory power selectively to the power lines 13a to 16a according to the content of the power control information registered in the power supply target bank indication register 121. As a result, according to the information set in the power supply target bank indication register 121, ON/OFF of the power of each memory bank is controlled. The writing of the power control information into the power supply target bank indication register 121 is carried out by the CPU 11 under the software control.

Namely, in this computer system, in view of the fact that the allocation and release of memory regions on the main memory with respect to various application programs are dynamically carried out according to requests from these application programs or application program termination notices from the operating system, a memory power management program that can cooperate with the operating system is used in such a manner that this memory power management program carries out the power management under the software control by checking a state of utilization of the main memory by the application programs or the system program, and stopping the power supply with respect to the memory bank in which all the memory regions are not utilized as valid one. A software configuration for this memory power management is shown in FIG. 2.

The memory power management program can be realized as a part of the operating system or a user program which operates on the operating system. In the following, an exemplary case in which the memory power management program is contained in the operating system itself will be described.

Figure 2:
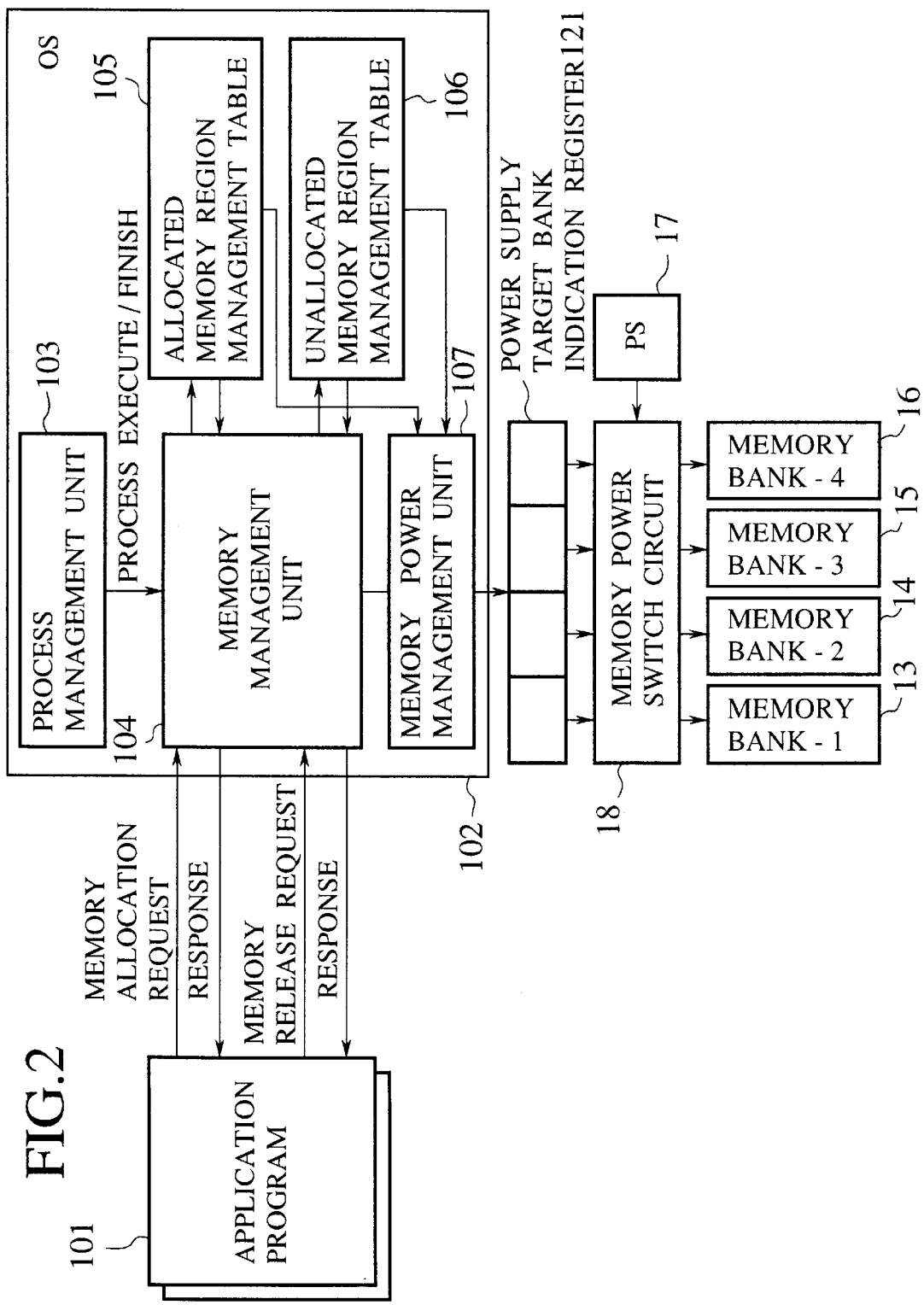
FIG. 2 is a block diagram showing a software configuration of the memory power management function in the first embodiment of the present invention.

As shown in FIG. 2, the operating system 102 contains programs related to a process management unit 103 for managing creation and termination of processes, a memory management unit 104 for managing allocation and release of the main memory with respect to various programs, and a memory power management unit 107 for for carrying out the memory power management described above. These process management unit 103, memory management unit 104, and memory power management unit 107 are realized as system programs constituting the operating system 102.

The memory management unit 104 carries out the allocation/release of memory on the main memory with respect to an application program 101 according to an explicit memory allocation/release request from the application program 101 or a program execution/termination notice from the process management unit 103, and the virtual memory management for automatically allocating a virtual memory to be utilized by the application program 101. In addition, the memory management unit 104 has a function for saving a part of the memory regions on the main memory into a secondary storage device such as a magnetic disk or a flash memory.

The control of allocation and release of the main memory by the memory management unit 104 is carried out by using an allocated memory region management table 105 and an unallocated memory region management table 106. The allocated memory region management table 105 registers a head address and a memory size of each memory region which is currently allocated to the application program or the system program executed in this system among the memory regions on the main memory. On the other hand, the unallocated memory region management table 106 registers a head address and a memory size of each memory region which is currently not used among the memory regions on the main memory (including those which are released after the allocation).

When the memory allocation is requested from the application program 101, the memory management unit 104 searches an unused memory region in the requested memory size from the unallocated memory region management table 106, and gives the head address and the memory size of that memory region to the application program 101.

Figure 3:
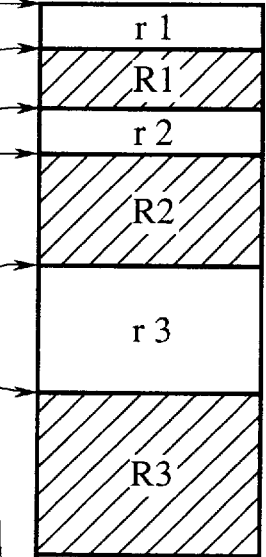
FIG. 3 is a diagram showing one exemplary correspondence between the utilization state of the memory regions on the main memory and the contents of management tables in the first embodiment of the present invention.

An exemplary correspondence between the utilization state of the memory regions on the main memory and the contents of these management tables 105 and 106 is shown in FIG. 3. As shown in FIG. 3, a continuous memory address space is allocated to the first to fourth memory banks 13–16 constituting the main memory. Here, the memory regions R1 to R3 on the main memory which are shaded in FIG. 3 are assumed to be currently used by the application program or the system program. Accordingly, the allocated memory region management table 105 registers the head address (or a pointer value pointing to that head address) and the memory size of each of these memory regions R1 to R3. On the other hand, the unallocated memory region management table 106 registers the head address (or a pointer value pointing to that head address) and the memory size of each of the unused regions r1 to r3.

Note that, usually, the memory address range to be used by the system program is fixedly specified in advance. The following description will be given for an exemplary case in which the system program uses the first memory bank 13 and the memory addresses of the second to fourth memory banks 14 to 16 are allocated to the application program 101.

Figures 4, 5:
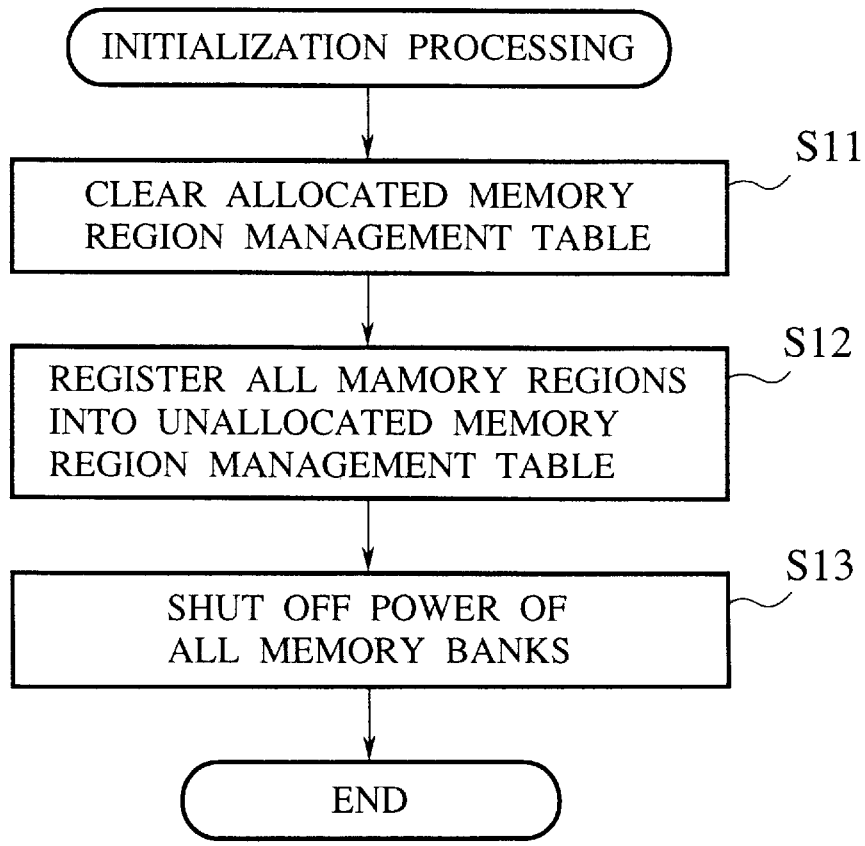
FIG. 4 is an illustration of an exemplary memory map information that can be used in the first embodiment of the present invention.
FIG. 5 is a flow chart of an initialization processing by the computer system in the first embodiment of the present invention.

The memory power management unit 107 shown in FIG. 2 checks the current memory utilization state by reading the registered contents of these management tables 105 and 106 either directly or via the memory management unit 104, and searches a memory bank with all its memory regions unused. In this case, which memory bank corresponds to each allocated/unallocated memory region can be recognized by referring to a memory map information as shown in FIG. 4 which indicates the correspondence between the memory banks and the memory address ranges allocated to them.

When a memory bank with all its memory region unused is found, the memory power management unit 107 enters the power control information for specifying the stopping of the power supply with respect to that unused memory bank into the power supply target bank indication register 121. This processing for detecting the unused memory bank by the memory power management unit 107 is executed every time the memory management unit 104 carries out the memory allocation/release according to the request from the application program 101.

Consequently, when the memory region R3 is released in FIG. 3, for example, the second memory bank 14 newly becomes an unused memory bank, so that the power supply to this second memory bank 14 will be stopped. Also, while the second memory bank 14 is in the power OFF state, when a memory region belonging to the memory address range of this second memory bank 14 is allocated to the application program 101, the power supply to the second memory bank 14 will be resumed.

Now, with references to the flow charts of FIG. 5 to FIG. 7, the concrete procedures for the main memory power management in this first embodiment will be described in detail.

FIG. 5 is the flow chart showing an initialization processing for the management tables 105 and 106.

At a time of turning on the power of the computer system, after the memory check is carried out, the memory management unit 104 first clears all the registered contents of the allocated memory region management table 105 except for the registered information for the specific memory region to be used by the system program (step S11), and registers the memory regions of all the memory banks other than the memory bank 13 to be used by the system program into the unallocated memory region management table 106 (step S12). Then, the memory power management unit 107 enters the power control information specifying the shut off of the power with respect to all the memory banks 14 to 16 other than the memory bank 13 into the power supply target bank indication register 121 so as to turn off the power with respect to the memory banks 14 to 16 (step S13).

Figure 6:
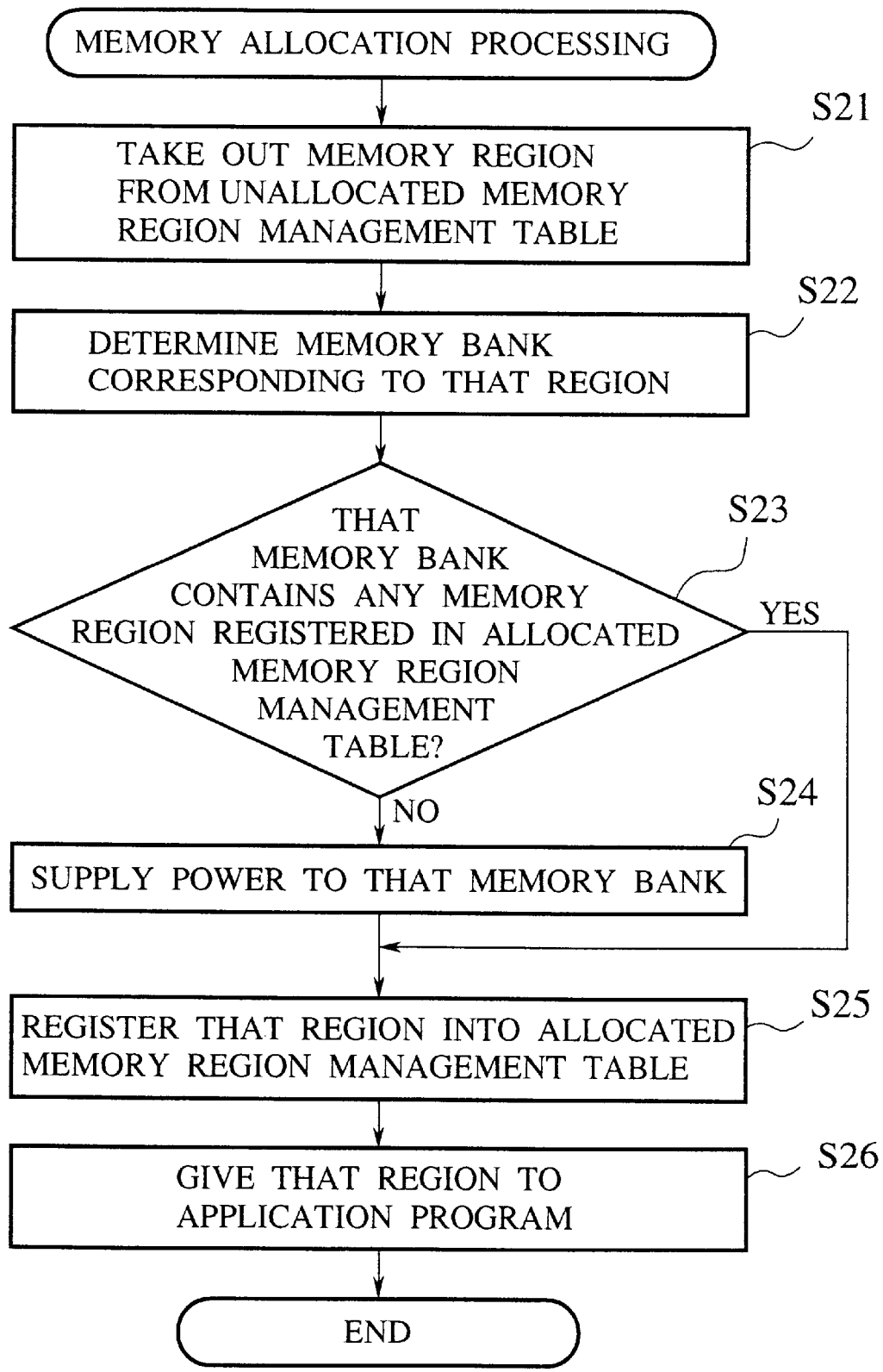
FIG. 6 is a flow chart of a memory allocation processing by the computer system in the first embodiment of the present invention.

FIG. 6 is the flow chart showing a memory allocation processing.

At a time of the memory allocation, the memory management unit 104 takes out a memory region to be allocated to the application program 101 from the unallocated memory region management table 106 according to the request from the application program 101 (step S21). Then, the memory bank corresponding to that memory region is determined by the memory power management unit 107 (step S22), and whether this determined memory bank contains any memory region which is registered in the allocated memory region region management table 105 or not is checked (step S23).

If this memory bank contains no such memory region, it implies that this memory bank is currently in the power OFF state, so that the memory power management unit 107 enters the power control information specifying the supply of the power to this memory bank into the power supply target bank indication register 121 (step S24). Then, the memory management unit 104 registers the memory region to be allocated to the application program 101 into the allocated memory region management table 105 (step S25), and gives this memory region to the application program 101 (step S26).

Figure 7:
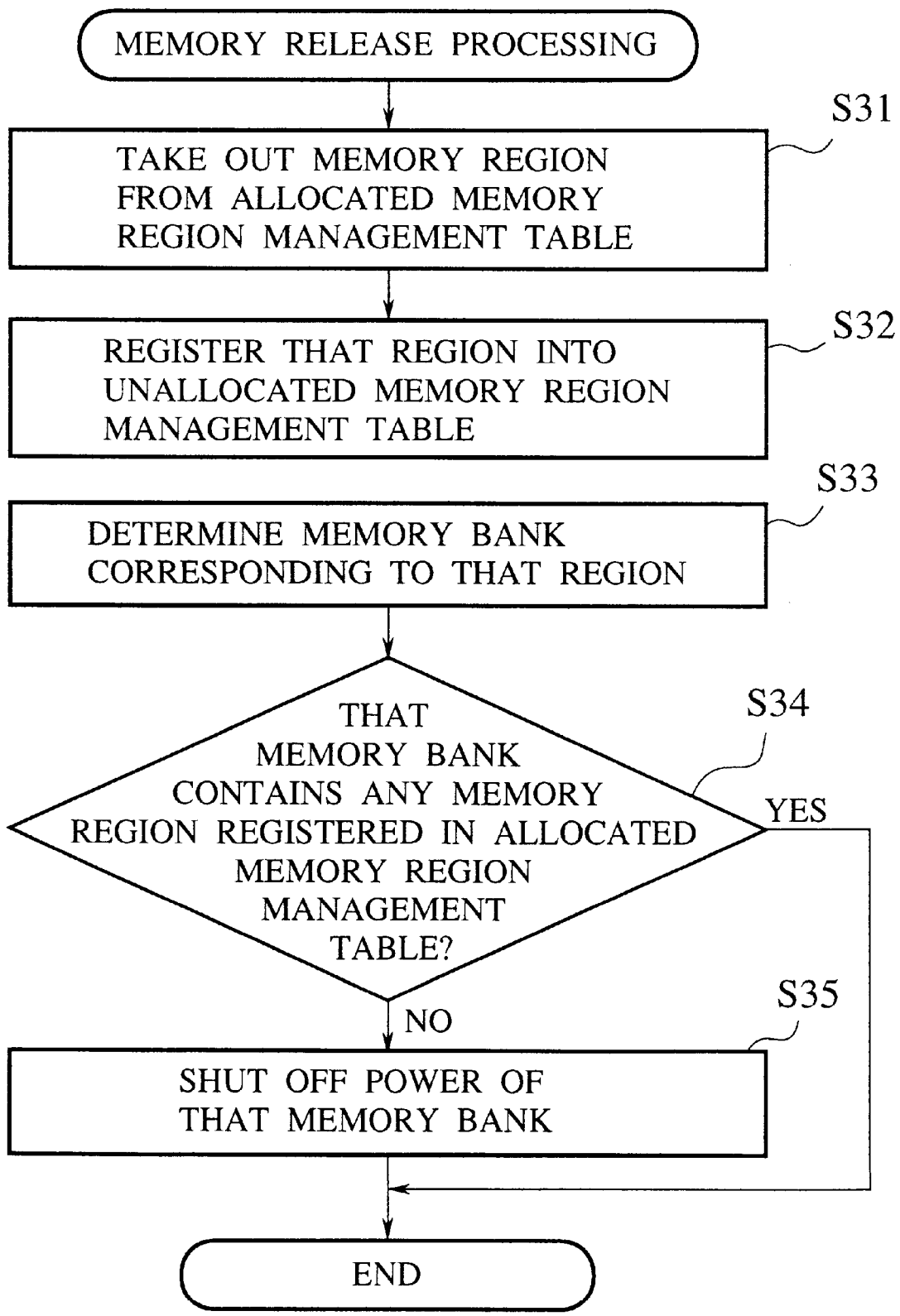
FIG. 7 is a flow chart of a memory release processing by the computer system in the first embodiment of the present invention.

FIG. 7 is a flow chart showing a memory release processing.

At a time of the memory release, the memory management unit 104 takes out a memory region specified by the application program 101 from the allocated memory region management table 105 (step S31), and registers this memory region into the unallocated memory region management table 106 (step S32). Then, the memory power management unit 107 determines the memory bank corresponding to that memory region which is newly registered into the unallocated memory region management table 106 (step S33), and whether this determined memory bank contains any memory region which is registered in the allocated memory region region management table 105 or not is checked (step S34).

If this memory bank contains no such memory region, the memory power management unit 107 enters the power control information specifying the shut off of the power to this memory bank into the power supply target bank indication register 121 (step S35).

As described, in the computer system of this first embodiment, the state of allocation and release of the memory region on the main memory with respect to the application program 101 is checked in cooperation with the memory management unit 104 of the operating system, and according to this memory region state, the memory bank with all its memory regions unused, that is, the memory bank with contains no memory region which is still allocated to the application program 101 and utilized as valid one, is determined. Then, the power supply with respect to that determined memory bank is stopped so that the power is supplied only with respect to the other memory banks. Consequently, it becomes possible to dynamically control the power supply with respect to the main memory according to the state of utilization of the main memory by the application program 101. Even in a case where the data write is carried out once, the power supply to the corresponding memory bank will be shut off when that data is invalidated. Thus, it is possible to realize the power management suitable for the power saving in the portable information terminal.

Figure 8:
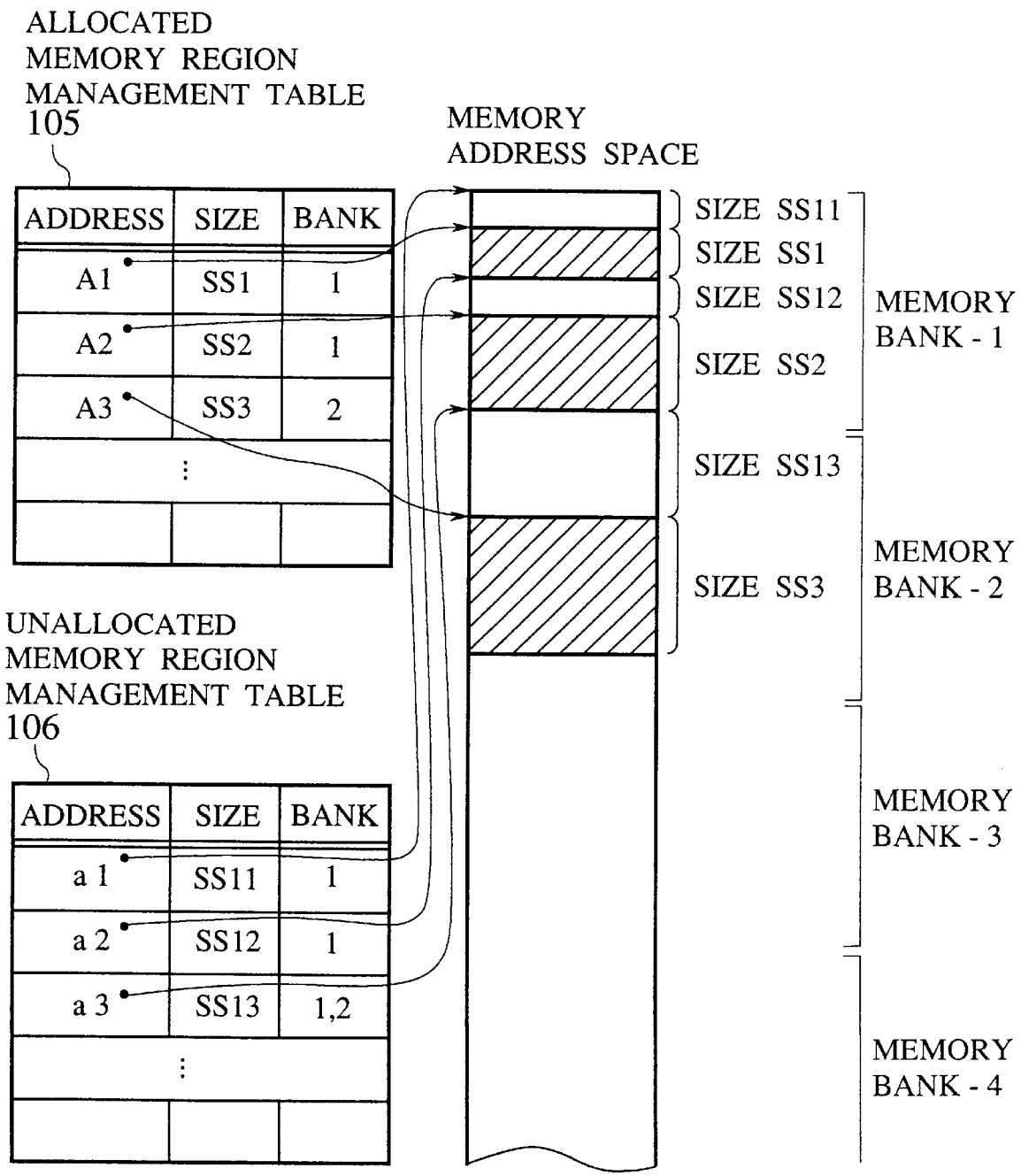
FIG. 8 is a diagram showing another exemplary correspondence between the utilization state of the memory regions on the main memory and the contents of management tables in the first embodiment of the present invention.

FIG. 8 shows another exemplary configuration of the allocated memory region management table 105 and the unallocated memory region management table 106. In this configuration of FIG. 8, each entry of the allocated memory region management table 105 registers a bank information indicating a memory bank which corresponds to each allocated memory region, in addition to the information on the head address and the memory size of each allocated memory region. Similarly, each entry of the unallocated memory region management table 106 also registers a bank information indicating a memory bank which corresponds to each unallocated memory region, in addition to the information on the head address and the memory size of each unallocated memory region.

By registering the bank information in the allocated memory region management table 105 and the unallocated memory region management table 106 in this manner, the memory power management unit 107 can judge whether each memory bank is the unused memory bank or the used memory bank immediately, so that it becomes possible to carry out the power control with respect to each memory bank more efficiently at a time of the memory allocation or the memory release.

Figure 9:
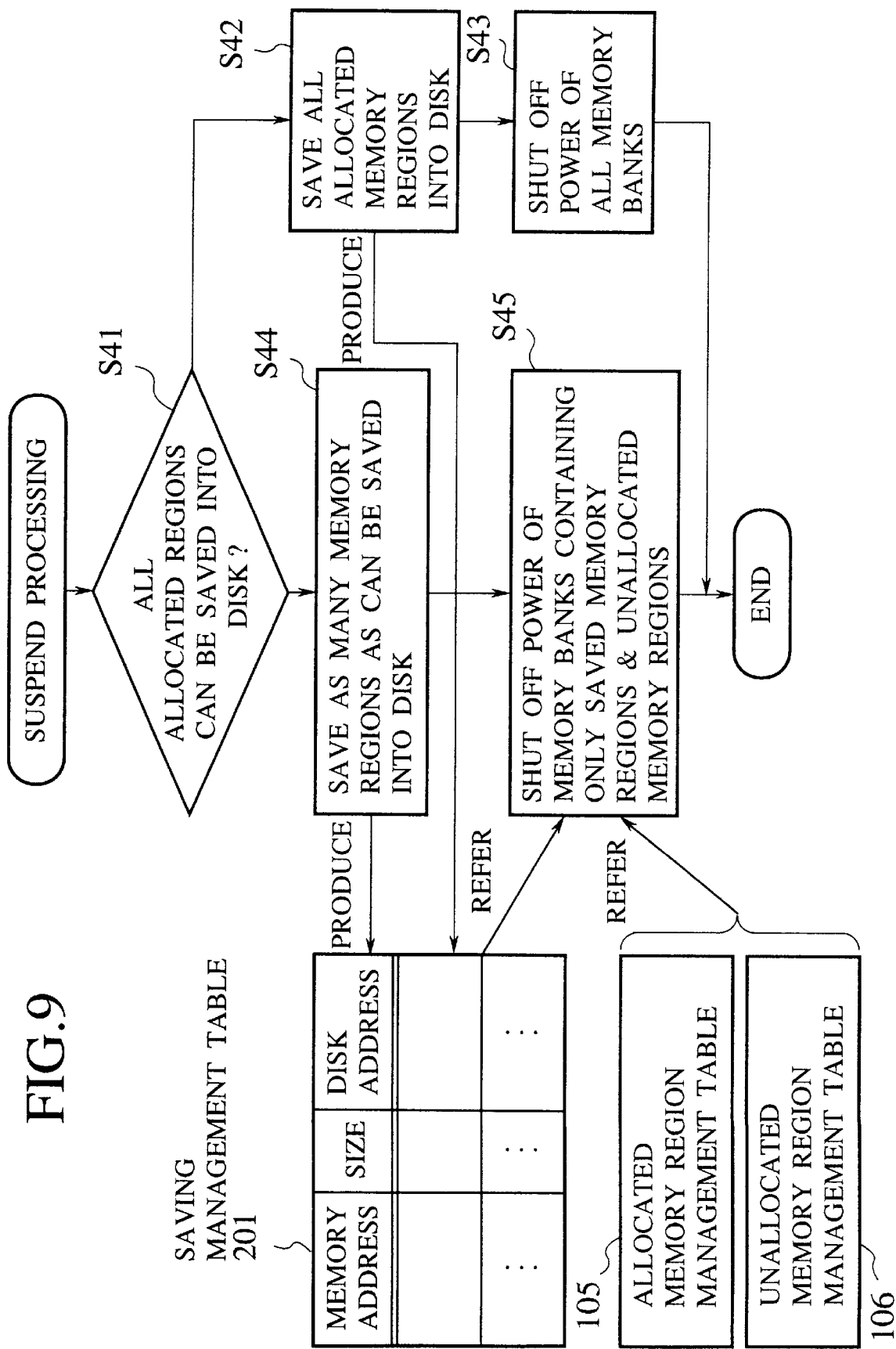
FIG. 9 is a flow chart of a suspend processing by the computer system in the second embodiment of the present invention.
Figure 10:
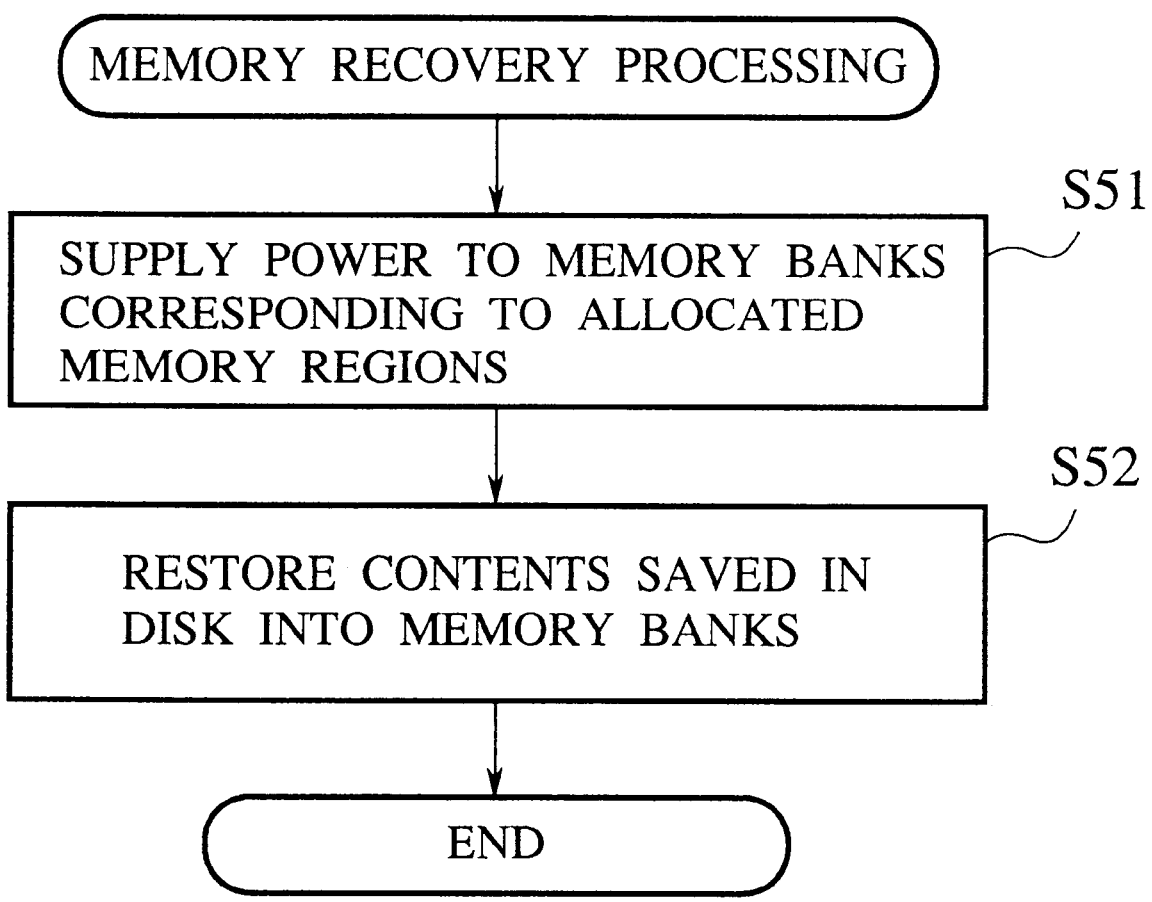
FIG. 10 is a flow chart of a memory recovery processing by the computer system in the second embodiment of the present invention.

Referring now to FIG. 9 and FIG. 10, the second embodiment of a computer system and its power management method according to the present invention will be described in detail.

In this second embodiment, in addition to the memory power management as in the first embodiment described above, a part of the stored content of the main memory is saved in a secondary storage device such as a disk device when an operation of the computer system is interrupted, and the power is supplied only to those memory banks corresponding to the memory regions whose information is not saved in the secondary storage among the allocated memory regions. Here, the hardware configuration of the computer system of this second embodiment is substantially similar to that of FIG. 1 described above.

While the system is in operation, the memory allocation and the memory release are carried out according to the requests from the application program 101 by the same procedures as in the first embodiment.

On the other hand, when the computer system is set in an idle state such as a state to wait for a key input, or when the operation is interrupted as in a case where the user depresses a suspend button or in a case of the system power turn off operation under the resume mode environment, for example, the operation mode is changed to a suspend mode in which the power supply with respect to almost all devices except for the main memory is stopped. In this case, in the computer system of this second embodiment, the saving of data from the main memory to the secondary storage device is carried out as described above in order to turn off the power supply for as many memory banks as possible.

FIG. 9 is a flow chart showing the procedure for this suspend processing.

In this procedure, the memory management unit 104 first checks whether a sufficient vacant capacity for saving all the allocated memory regions on the main memory is available in the secondary storage device or not (step S41). When the secondary storage device has a sufficient vacant capacity so that all the allocated memory regions on the main memory can be saved, the memory management unit 104 saves data of all the allocated memory regions on the main memory into the secondary storage device (step S42).

In this case, the memory management unit 104 produces a saving management table 201 as shown in FIG. 9 in order to enable the recovery of a state of the stored content of the main memory before the saving. This saving management table 201 registers a head memory address, a memory size, and an address on the secondary storage device (a disk address) for each memory region on the main memory which is saved into the secondary storage device.

Then, the memory power management unit 107 enters the power control information specifying the shut off of the power to all the memory banks of the main memory into the power supply target bank indication register 121, regardless of whether each region is allocated or unallocated (step S43).

On the other hand, when the secondary storage device only has a vacant capacity sufficient for saving a part of the allocated memory regions on the main memory, the memory management unit 104 saves data of as many memory regions as can be saved into the secondary storage device (step S44). In this case, the saving management table 201 is also produced similarly as described above.

Then, the memory power management unit 107 refers to the management tables 105, 106, and 201 to find those memory banks which only contain the unallocated memory regions and the already saved memory regions without any allocated memory region which is not yet saved, and enters the power control information specifying the shut off of the power to these memory banks into the power supply target bank indication register 121 (step S45).

In a case of resuming the normal state from the operation interrupted or suspended state, a memory recovery processing shown in FIG. 10 is carried out.

Namely, the memory power management unit 107 first enters the power control information specifying the start of the power supply with respect to all the memory banks containing the allocated memory regions into the power supply target bank indication register 121 (step S51). Then, the memory management unit 104 restores the saved data on the secondary storage device into the memory banks of the main memory according to the content of the saving management table 201 (step S52).

By the above procedures, the power is also shut off for the memory bank corresponding to the memory region which is used by the application program 101 but saved in the secondary storage device, so that this second embodiment can reduce the power consumption of the computer system even more than the first embodiment.

Note that the data saving processing for the purpose of increasing the unused memory regions may also be carried out with respect to the memory regions with low utilization frequencies, for example, during the normal operation rather than just at a time of the operation interruption or suspension.

Referring now to FIG. 11 to FIG. 16, the third embodiment of a computer system and its power management method according to the present invention will be described in detail.

In this third embodiment, in addition to the memory power management as in the first embodiment described above, the unallocated memory regions are increased by compressing data on the main memory and a part of the stored content of the main memory is saved in a secondary storage device such as a disk device when an operation of the computer system is interrupted, and the power is supplied only to those memory banks corresponding to the memory regions whose information is not saved in the secondary storage among the allocated memory regions. Here, the hardware configuration of the computer system of this third embodiment is substantially similar to that of FIG. 1 described above.

While the system is in operation, the memory allocation and the memory release are carried out according to the requests from the application program 101 by the same procedures as in the first embodiment.

On the other hand, when the operation mode is changed to the operation interrupted or suspended state, the compression of data on the main memory and the saving of data from the main memory to the secondary storage device is carried out in order to turn off the power supply for as many memory banks as possible.

Figure 11:
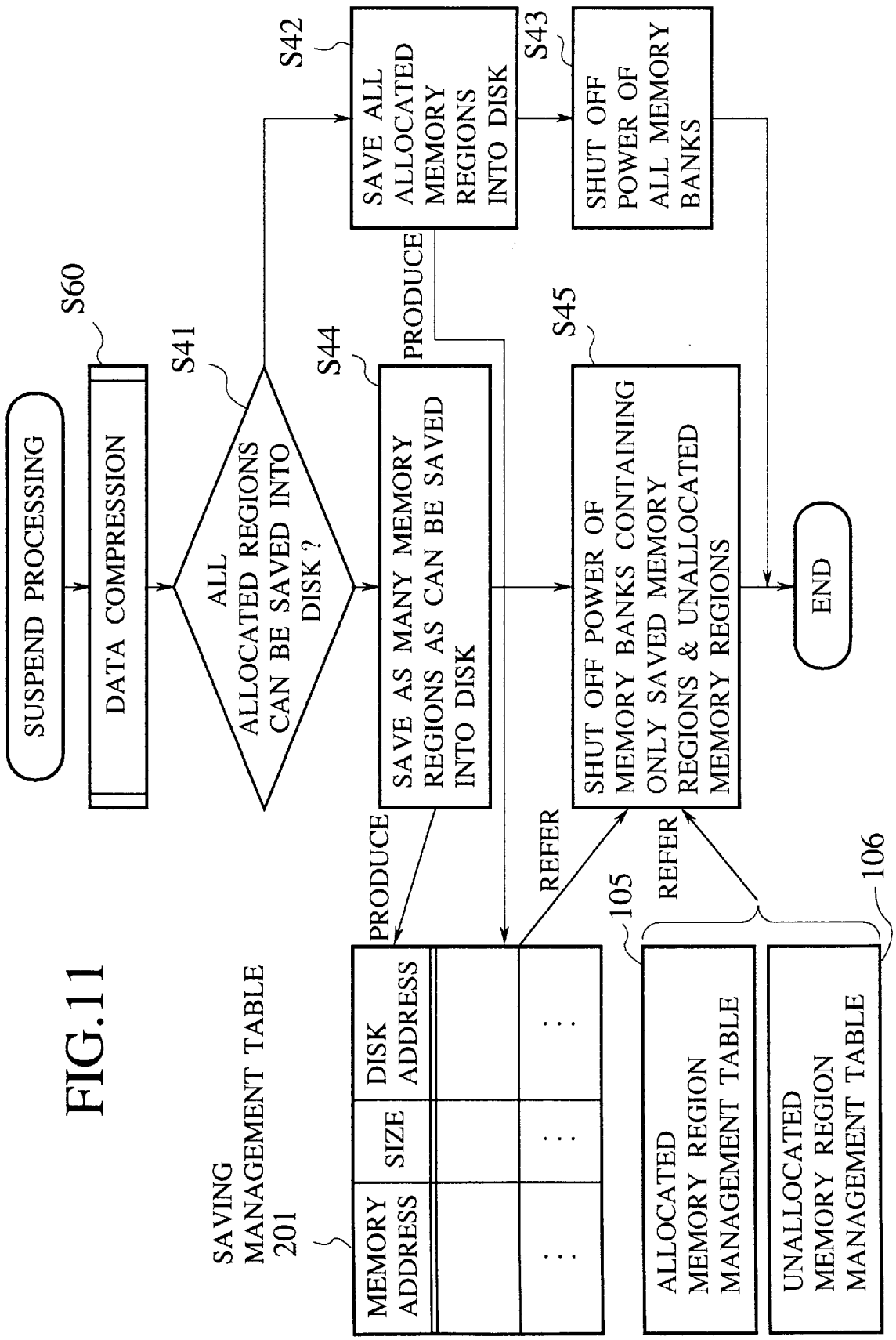
FIG. 11 is a flow chart of a suspend processing by the computer system in the third embodiment of the present invention.

FIG. 11 is a flow chart showing the procedure for this suspend processing.

In this procedure, when the operation of the computer system is interrupted or suspended, the memory management unit 104 first carries out the data compression for each allocated memory region on the main memory (step S60). Then, by the same procedure as in the second embodiment described above, the compressed data are saved to the secondary storage device (steps S41 to S45).

Figure 12:
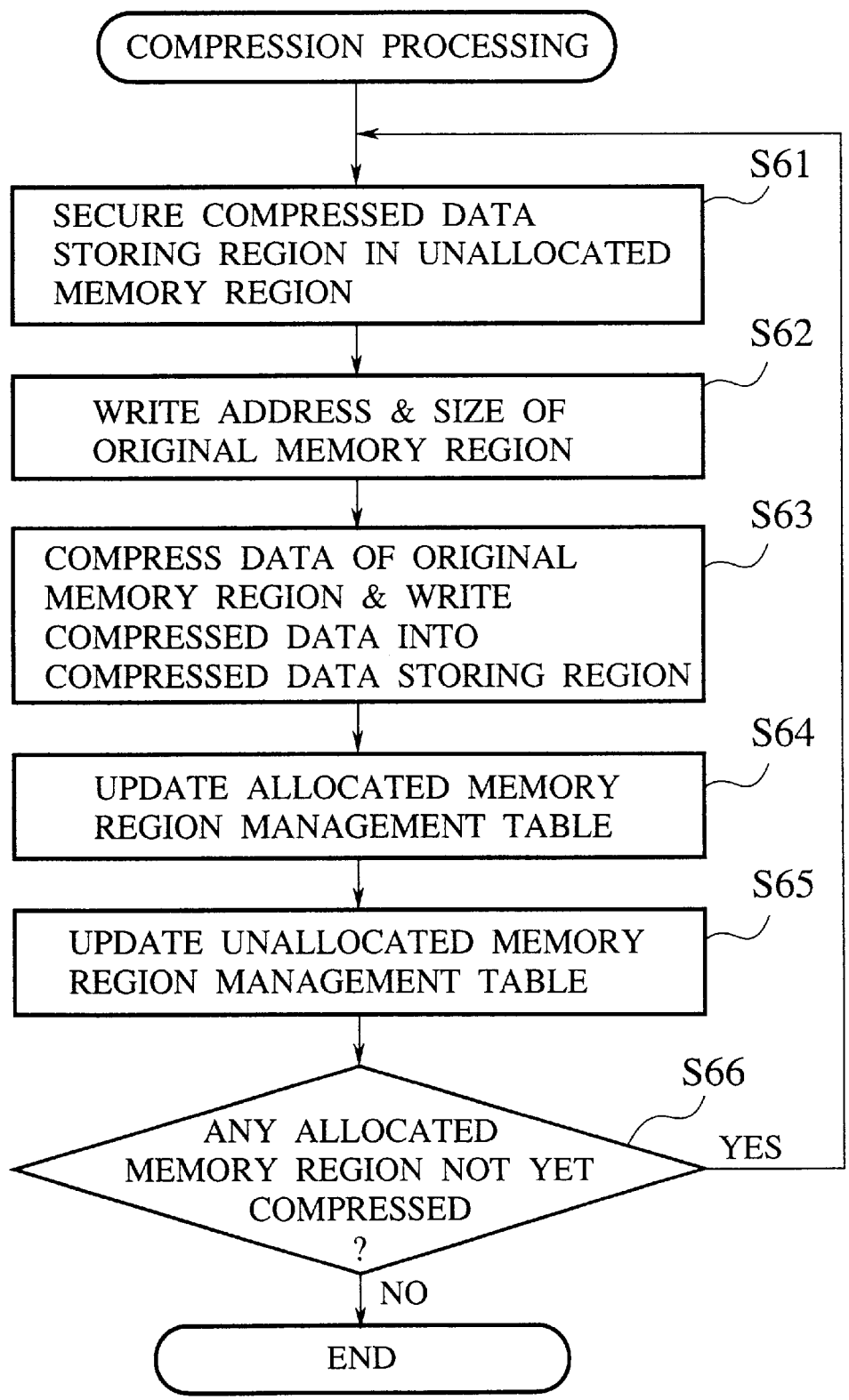
FIG. 12 is a flow chart of a compression processing by the computer system in the third embodiment of the present invention.

Now, the detailed procedure of the data compression processing at the step S60 of FIG. 11 will be described with references to FIG. 12 and FIG. 13.

First, the memory management unit 104 secures a compressed data storing region in the unallocated memory region (step S61), and writes the head address and the memory size of the allocated memory region to be compressed (original memory region) (step S62). In this case, it is preferable to select the compressed data storing region from the memory bank to which the power is currently supplied. When a sufficient unallocated memory region does not exist in the memory bank to which the power is currently supplied, the power supply to the memory bank to which the power is currently not supplied is resumed, and then the compressed data storing region is selected from that memory bank.

Next, the memory management unit 104 compresses data of the allocated memory region to be compressed, and writes the compressed data into the compressed data storing region (step S63). Then, the memory management unit 104 updates the content of the allocated memory region management table 105 by invalidating the information on the head address and the memory size of the allocated memory region just compressed, and registering instead the head address and the memory size of the compressed data storing region, in the allocated memory region management table 105 (step S64). Similarly, the content of the unallocated memory region management table 106 is updated by invalidating the information on the head address and the memory size of the compressed data storing region into which the compressed data are just written, and registering instead the head address and the memory size of the allocated memory region just compressed, in the unallocated memory region management table 106 (step S65).

Figure 13:
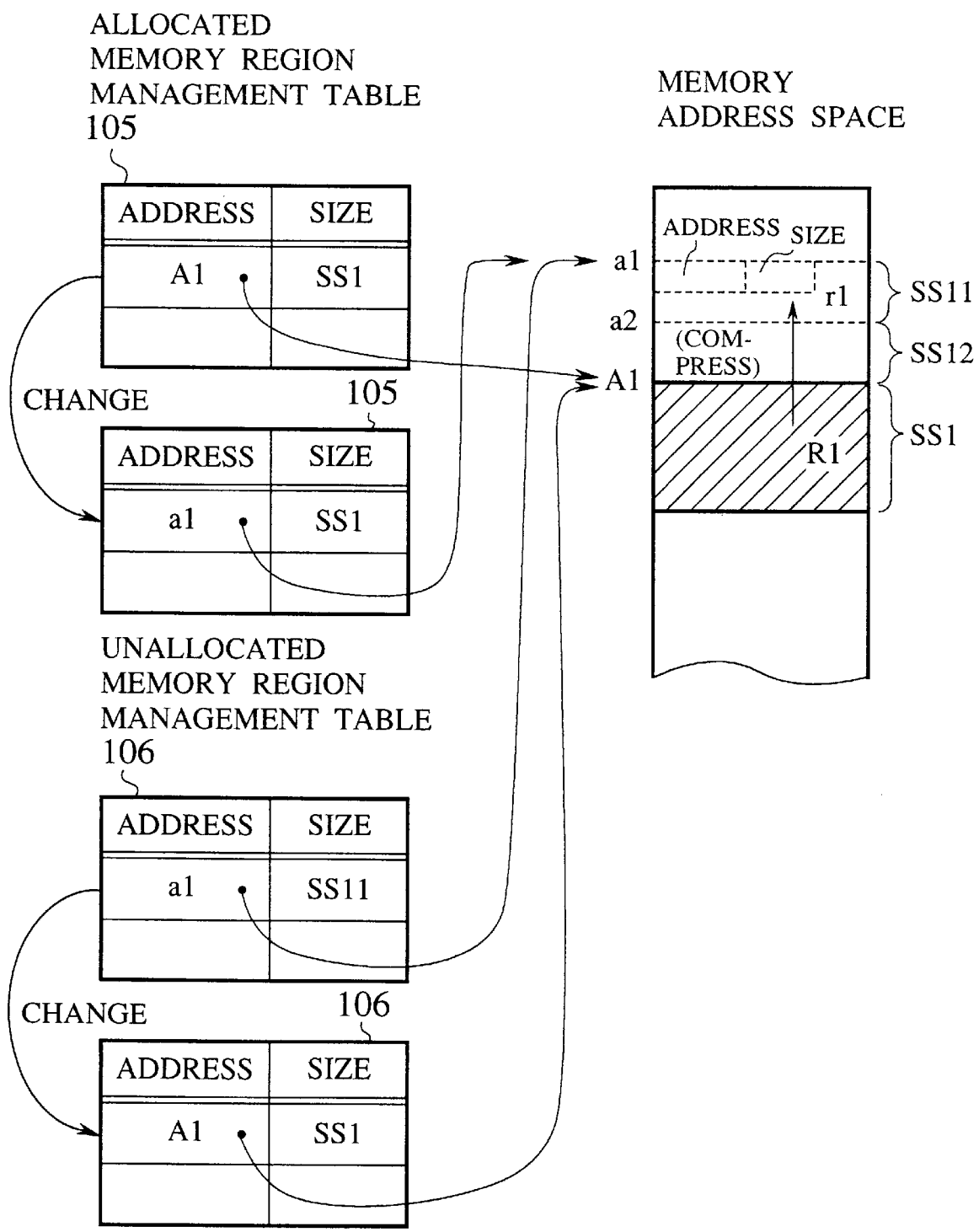
FIG. 13 is a diagram showing an exemplary correspondence between the utilization state of the memory regions on the main memory and the contents of management tables in the third embodiment of the present invention at a time of data compression.

For example, as shown in FIG. 13, in a case of compressing data of the allocated memory region R1 and storing the compressed data into the unallocated memory region r1, the head address A1 and the memory size SS1 of the memory region R1 are written into the memory region r1. Then, the content of the allocated memory region management table 105 is rewritten from the head address A1 and the memory size SS1 of the memory region R1 to the head address a1 and the memory size SS11 of the memory region r1. Also, the content of the unallocated memory region management table 106 is rewritten from the head address a1 and the memory size SS11 of the memory region r1 to the head address A1 and the memory size SS1 of the memory region R1.

The procedure of these steps S61 to S65 is repeated for all the allocated memory regions (step S66).

Figure 14:
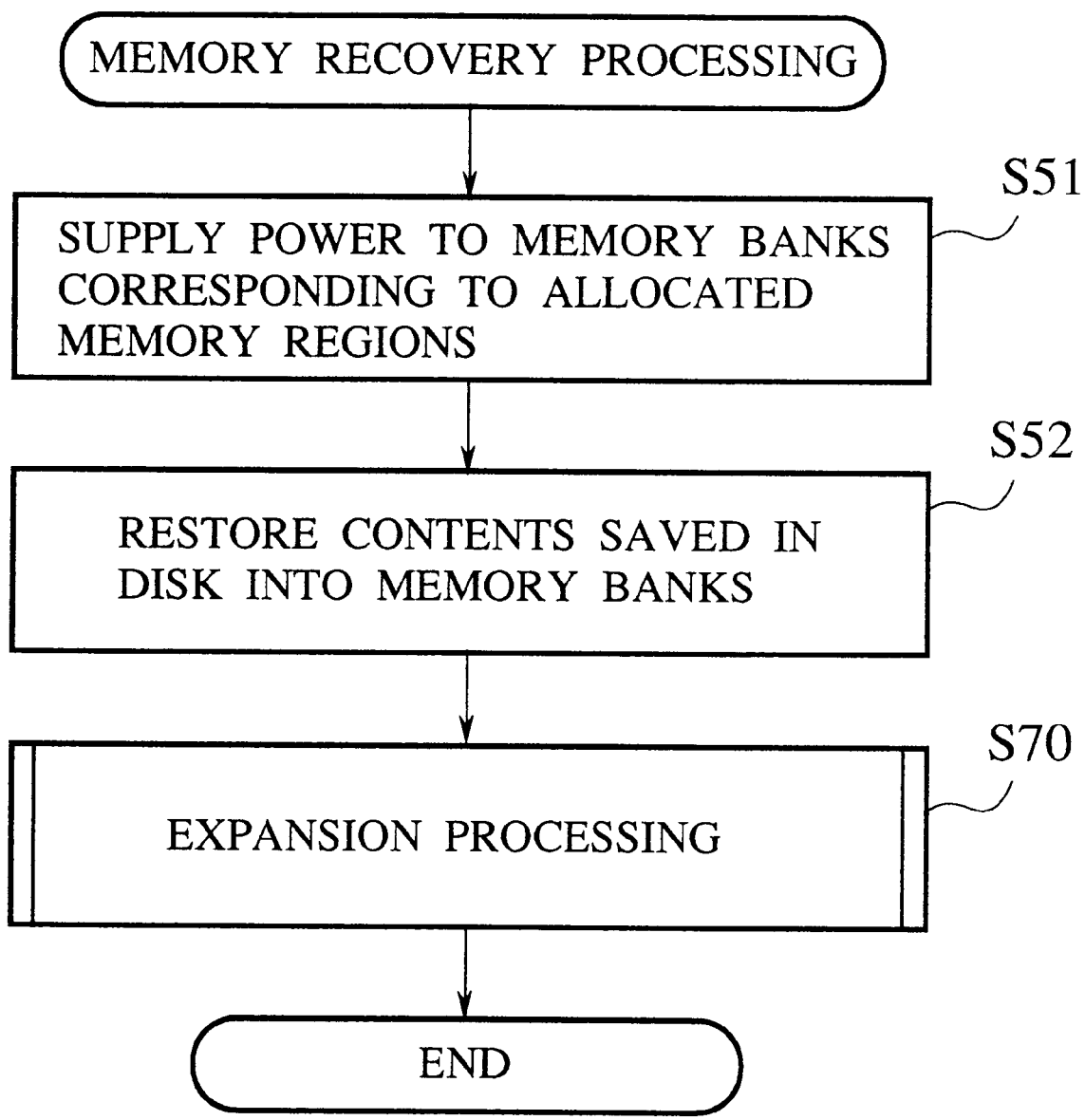
FIG. 14 is a flow chart of a memory recovery processing by the computer system in the third embodiment of the present invention.

In a case of resuming the normal state from the operation interrupted or suspended state, a memory recovery processing shown in FIG. 14 is carried out.

Namely, by the same procedure as in the second embodiment described above, a processing for starting the power supply with respect to all the memory banks containing the allocated memory regions (step S51) and a processing for restoring the saved data from the secondary storage device to the main memory according to the content of the saving management table 201 (step S52) are carried out. Then, an expansion processing to recover the state before the compression by expanding data on the main memory is carried out (step S70).

Figure 15:
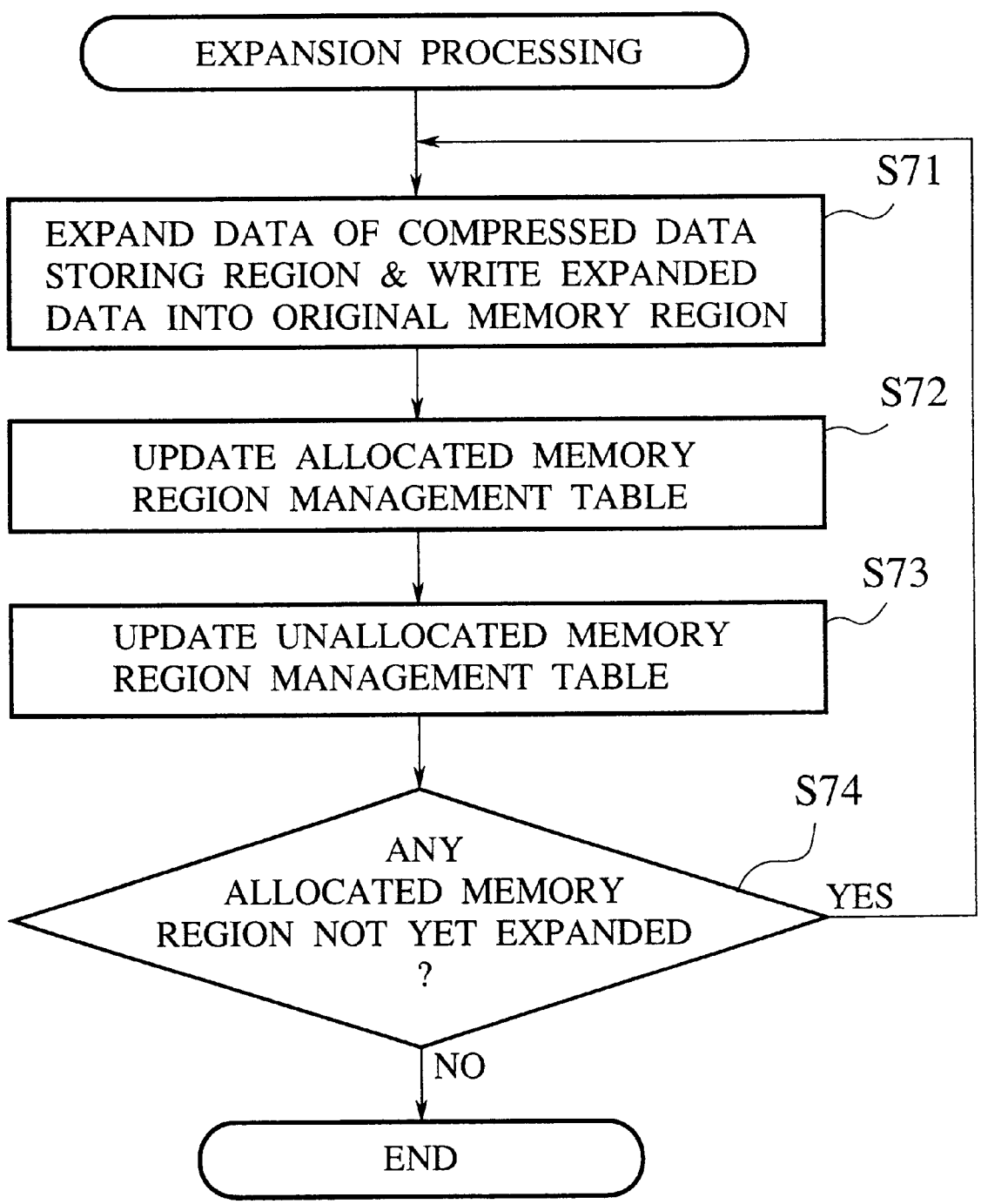
FIG. 15 is a flow chart of an expansion processing by the computer system in the third embodiment of the present invention.

Now, the detailed procedure of the data expansion processing at the step S70 of FIG. 14 will be described with references to FIG. 15 and FIG. 16.

First, the memory management unit 104 expands the compressed data of the memory region registered in the allocated memory region management table 105, that is, the compressed data storing region, and writes the expanded data into the original memory region specified by the head address and the memory size written in that compressed data storing region (step S71). In this case, if the memory bank which contains the original memory region specified by the head address and the memory size written in the compressed data storing region is in the power OFF state, the processing to write the expanded data is carried out after the power supply to that memory bank is resumed.

Then the memory management unit 104 updates the content of the allocated memory region management table 105 by invalidating the information on the head address and the memory size of the compressed data storing region, and registering instead the head address and the memory size of the original memory region into which the expanded data are just written, in the allocated memory region management table 105 (step S72). Similarly, the content of the unallocated memory region management table 106 is updated by invalidating the information on the head address and the memory size of the original memory region into which the expanded data are just written, and registering instead the head address and the memory size of the compressed data storing region, in the unallocated memory region management table 106 (step S73).

Figure 16:
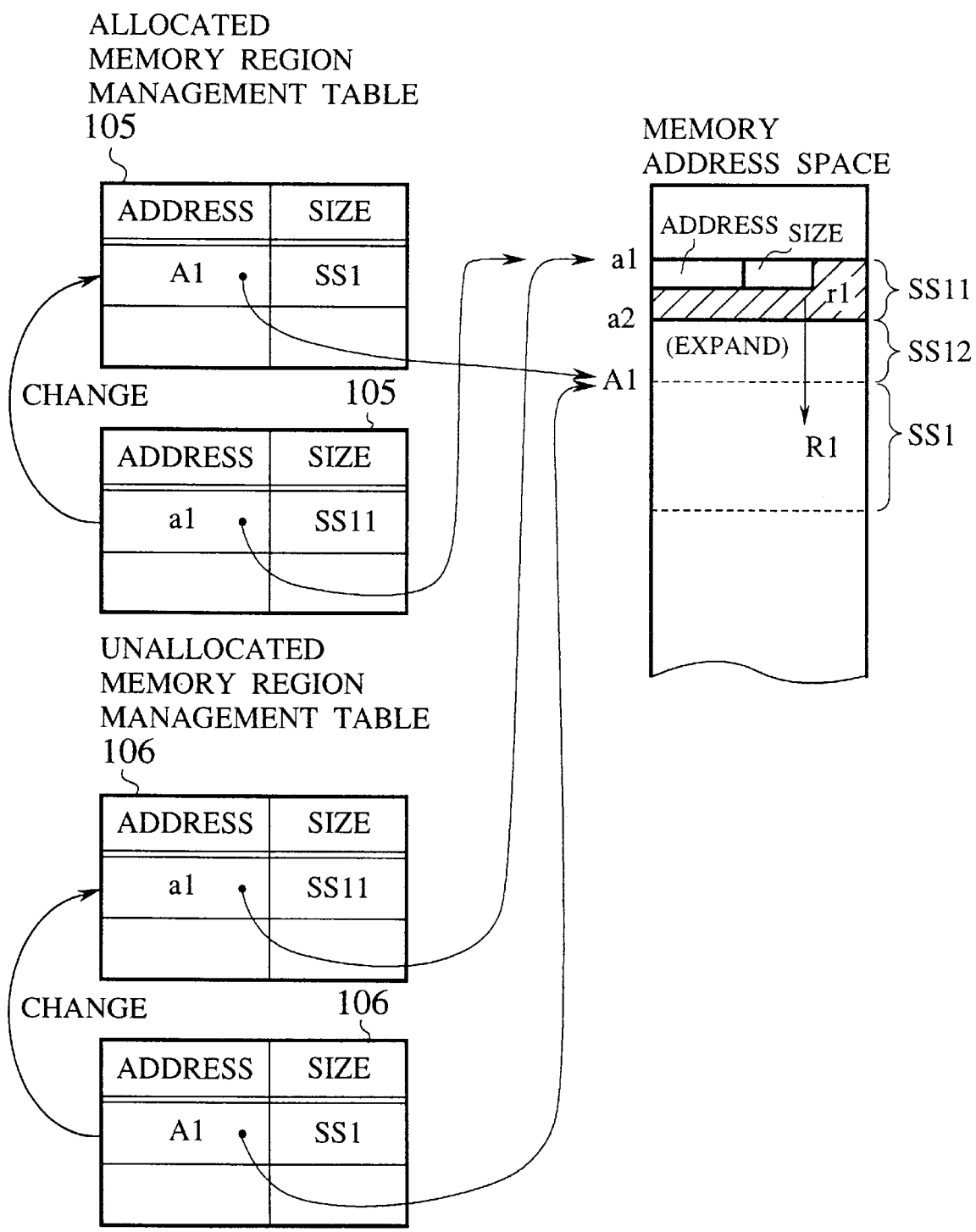
FIG. 16 is a diagram showing an exemplary correspondence between the utilization state of the memory regions on the main memory and the contents of management tables in the third embodiment of the present invention at a time of data expansion.

For example, as shown in FIG. 16, in a case of expanding compressed data of the compressed data storing region r1 and storing the expanded data into the original memory region R1, the content of the allocated memory region management table 105 is rewritten from the head address a1 and the memory size SS11 of the memory region r1 to the head address A1 and the memory size SS1 of the memory region R1. Also, the content of the unallocated memory region management table 106 is rewritten from the head address A1 and the memory size SS1 of the memory region R1 to the head address a1 and the memory size SS11 of the memory region r1.

The procedure of these steps S71 to S73 is repeated for all the compressed data storing regions (step S74).

By the above procedures, more data can be saved into the secondary storage device because of the compression, while the data remaining on the main memory also has a reduced capacity because of the compression. Consequently, it becomes possible to shut off the power for more memory banks, so that this third embodiment can reduce the power consumption of the computer system even more than the second embodiment.

Note that the data compression processing for the purpose of increasing the unused memory regions may also be carried out with respect to the memory regions with low utilization frequencies, for example, during the normal operation rather than just at a time of the operation interruption or suspension.

Figure 17:
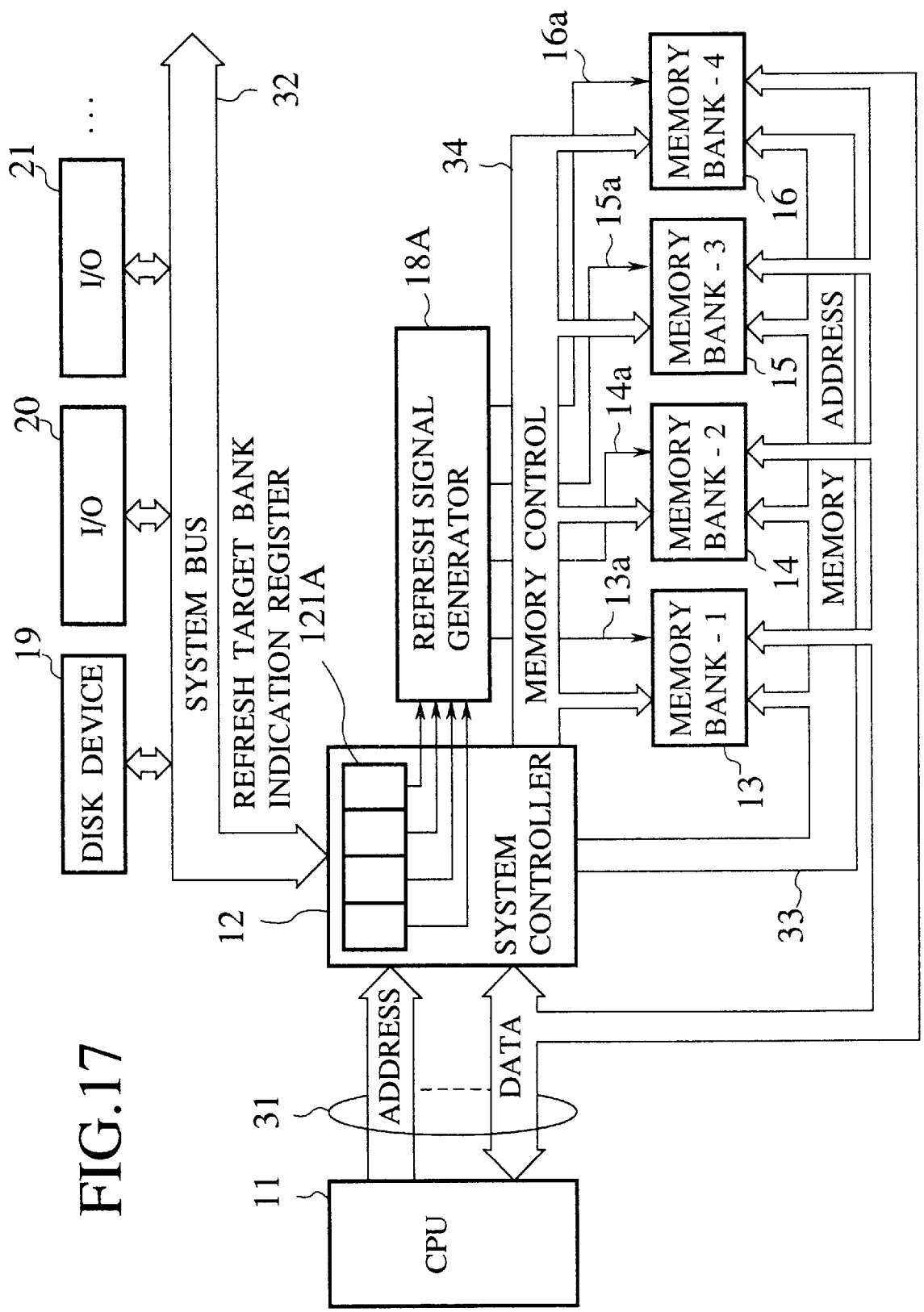
FIG. 17 is a block diagram showing a hardware configuration of a main part of the computer system in the fourth embodiment of the present invention.

Referring now to FIG. 17, the fourth embodiment of a computer system and its power management method according to the present invention will be described in detail.

In the first to third embodiments described above, the power management is carried out by controlling the power supply to the memory banks, but in this fourth embodiment the reduction of the power consumption is realized by utilizing the selective execution of the refresh operation for the memory element.

Namely, in the memory element such as DRAM, the stored content can be lost unless the refresh operation is carried out, and the power consumption is largely affected by whether or not to carry out the refresh operation. In a case of using such memory elements for the memory banks, the reduction of the power consumption can be realized by not giving a refresh signal to the memory bank in which all the memory regions are not utilized as valid one, without using the shut off of the power supply. In general, a circuit for controlling refresh signals can be realized by a simpler circuit configuration than a circuit for controlling power supply.

FIG. 17 shows a hardware configuration of a portion related to the main memory device in the computer system of this fourth embodiment. This computer system of FIG. 17 differs from that of FIG. 1 in that a refresh signal generator 18A is provided instead of the memory power switch circuit 18 of FIG. 1, and the system controller 12 has a refresh target bank indication register 121A instead of the power supply target bank indication register 121 of FIG. 1. The other elements of this computer system of FIG. 17 are substantially the same as those of FIG. 1 as indicated by the same reference numerals given in the figures.

The refresh signal generator 18A selectively generates the refresh signal with respect to each memory bank according to the information set in the refresh target bank indication register 121A. By means of this operation, whether or not to carry out the refresh operation at each memory bank is controlled according to the information set in the refresh target bank indication register 121A. The writing of the refresh signal control information into the refresh target bank indication register 121A is carried out by the CPU 11 under the software control, similarly as in a case of the power supply target bank indication register 121 of FIG. 1.

As described, according to the present invention, the power is supplied only to the memory banks which are actually utilized by the software among a plurality of volatile memory banks constituting the main memory. In addition, a number of power supply target memory banks can be further reduced by means of the saving into the secondary storage device and the data compression at a time of the operation interruption or suspension. Consequently, it is possible to reduce the power consumption of the main memory device, so that the continuously operable time can be extended or the battery capacity can be reduced in the portable information terminal.

It is to be noted that the above description has been directed to an exemplary case in which the memory power management function including the data compression and saving processing is provided in the operating system itself, but this memory power management function according to the present invention can also be realized as a user program such as a utility which operates on the operating system. By storing such an operating system or a user program in a recording medium such as floppy disk, CD-ROM, PC card, etc., and distributing that recording medium to the user, it becomes possible to reduce the power consumption of the main memory considerably by simply installing such an operating system or a user program from the distributed recording medium into a user's portable information terminal.

Note here that the memory power management function according to the present invention may be conveniently implemented in a form of a software package or a computer system programmed according to the teachings of the present specification, as will be apparent to those skilled in the computer art. Appropriate software coding can readily be prepared by skilled programmers based on the teachings of the present disclosure, as will be apparent to those skilled in the software art.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A computer system, comprising:
   a main memory device formed by a plurality of memory banks;
   a power source for supplying a power to operate the main memory device;
   a processor for executing programs and managing allocation and release of memory regions on the main memory device with respect to the programs; and
   memory power management means for determining any unused memory bank in which all memory regions are currently unused according to a state of the allocation and release of the memory regions on the main memory devices with respect to the programs managed by the processor, and selectively stopping a power supply from the power source to the unused memory bank while supplying the power from the power source to remaining memory banks other than the unused memory bank, so as to manage memory power supply in relation to memory management by the processor.

2. The computer system of claim 1, further comprising:
   a secondary storage device for saving data stored in the memory regions allocated to the programs;
   wherein the memory power management means determines the unused memory bank as a memory bank which only contains those memory regions which are allocated to the programs and whose stored data are already saved in the secondary storage device, and/or those memory regions which are unallocated to the programs.

3. The computer system of claim 2, wherein the secondary memory device saves the stored data when an operation of the computer system is interrupted/suspended.

4. The computer system of claim 1, further comprising:

data compression means for compressing stored data on those memory regions which are allocated to the programs, and rewriting compressed data into prescribed memory regions on the main memory device so as to increase a number of unused memory regions on the main memory device.

5. The computer system of claim 4, further comprising:

a secondary storage device for saving the compressed data stored in the prescribed memory regions;

wherein the memory power management means determines the unused memory bank as a memory bank which only contains those memory regions which are allocated to the programs and whose stored data are already saved in the secondary storage device, and/or those memory regions which are unallocated to the programs.

6. The computer system of claim 4, wherein the data compression means compresses the stored data and rewrites the compressed data when an operation of the computer system is interrupted/suspended.

7. The computer system of claim 1, wherein the memory power management means includes:

program means for determining any unused memory bank in which all memory regions are currently unused according to the state of the allocation and release of the memory regions on the main memory devices with respect to the programs managed by the processor;

register means for specifying the unused memory bank determined by the program means; and switch means for selectively stopping a power supply from the power source to the unused memory bank specified by the register means while supplying the power from the power source to the remaining memory banks other than the unused memory bank.

8. A computer system, comprising:

a main memory device formed by a plurality of memory banks in forms of memory elements which require refresh operations in order to maintain stored data;

a processor for executing programs and managing allocation and release of memory regions on the main memory device with respect to the programs; and memory power management means for determining any unused memory bank in which all memory regions are currently unused according to a state of the allocation and release of the memory regions on the main memory devices with respect to the programs managed by the processor, and selectively stopping a refresh signal for the unused memory bank while providing refresh signals for remaining memory banks other than the unused memory bank, so as to manage memory power supply in relation to memory management by the processor.

9. The computer system of claim 8, wherein said plurality of memory banks are given in forms of DRAMs.

10. The computer system of claim 8, wherein the memory power management means includes:

program means for determining any unused memory bank in which all memory regions are currently unused according to the state of the allocation and release of the memory regions on the main memory devices with respect to the programs managed by the processor;

register means for specifying the unused memory bank determined by the program means; and refresh signal generator means for selectively not generating a refresh signal for the unused memory bank specified by the register means while generating refresh signals for the remaining memory banks other than the unused memory bank.

11. A memory power management method for a computer system having a main memory device formed by a plurality of memory banks, a power source for supplying a power to operate the main memory device, and a processor for executing programs and managing allocation and release of memory regions on the main memory device with respect to the programs, the method comprising the steps of:

determining any unused memory bank in which all memory regions are currently unused according to a state of the allocation and release of the memory regions on the main memory devices with respect to the programs managed by the processor; and selectively stopping a power supply from the power source to the unused memory bank while supplying the power from the power source to remaining memory banks other than the unused memory bank, so as to manage memory power supply in relation to memory management by the processor.

12. The method of claim 11, further comprising the step of:

saving data stored in the memory regions allocated to the programs into a secondary storage device of the computer system;

wherein the determining step determines the unused memory bank as a memory bank which only contains those memory regions which are allocated to the programs and whose stored data are already saved in the secondary storage device, and/or those memory regions which are unallocated to the programs.

13. The method of claim 12, wherein the saving step saves the stored data when an operation of the computer system is interrupted/suspended.

14. The method of claim 11, further comprising the step of:

compressing stored data on those memory regions which are allocated to the programs, and rewriting compressed data into prescribed memory regions on the main memory device so as to increase a number of unused memory regions on the main memory device.

15. The method of claim 14, further comprising the step of:

saving the compressed data stored in the prescribed memory regions into a secondary storage device of the computer system;

wherein the determining step determines the unused memory bank as a memory bank which only contains those memory regions which are allocated to the programs and whose stored data are already saved in the secondary storage device, and/or those memory regions which are unallocated to the programs.

16. The method of claim 14, wherein the compressing step compresses the stored data and rewrites the compressed data when an operation of the computer system is interrupted/suspended.

17. A memory power management method for a computer system having a main memory device formed by a plurality of memory banks in forms of memory elements which require refresh operations in order to maintain stored data, and a processor for executing programs and managing allocation and release of memory regions on the main memory device with respect to the programs, the method comprising the steps of:

determining any unused memory bank in which all memory regions are currently unused according to a state of the allocation and release of the memory regions on the main memory devices with respect to the programs managed by the processor; and selectively stopping a refresh signal for the unused memory bank while providing refresh signals for remaining memory banks other than the unused memory bank, so as to manage memory power supply in relation to memory management by the processor.

18. The computer system of claim 17, wherein said plurality of memory banks are given in forms of DRAMs, and the selectively stopping step selectively stops the refresh signal for a DRAM constituting the unused memory bank while providing the refresh signals for DRAMs constituting the remaining memory banks.

19. An article of manufacture, comprising:

a computer usable medium having computer readable program code means embodied therein for causing a computer to function as a memory power management unit for a computer system having a main memory device formed by a plurality of memory banks, a power source for supplying a power to operate the main memory device, and a processor for executing programs and managing allocation and release of memory regions on the main memory device with respect to the programs, the computer readable program code means including:

first computer readable program code means for causing said computer to determine any unused memory bank in which all memory regions are currently unused according to a state of the allocation and release of the memory regions on the main memory devices with respect to the programs managed by the processor; and second computer readable program code means for causing said computer to selectively stop a power supply from the power source to the unused memory bank while supplying the power from the power source to remaining memory banks other than the unused memory bank, so as to manage memory power supply in relation to memory management by the processor.

20. An article of manufacture, comprising:

a computer usable medium having computer readable program code means embodied therein for causing a computer to function as a memory power management unit for a computer system having a main memory device formed by a plurality of memory banks in forms of memory elements which require refresh operations in order to maintain stored data, and a processor for executing programs and managing allocation and release of memory regions on the main memory device with respect to the programs, the computer readable program code means including:

first computer readable program code means for causing said computer to determine any unused memory bank in which all memory regions are currently unused according to a state of the allocation and release of the memory regions on the main memory devices with respect to the programs managed by the processor; and second computer readable program code means for causing said computer to selectively stop a refresh signal for the unused memory bank while providing refresh signals for remaining memory banks other than the unused memory bank, so as to manage memory power supply in relation to memory management by the processor.

* * * * *